(12) United States Patent
Imanishi et al.

(10) Patent No.: US 7,859,161 B2
(45) Date of Patent: Dec. 28, 2010

(54) ROTATIONAL ELECTRIC MACHINE HAVING FIELD WINDING FORMED BY COUPLING FORMED COIL TO BOBBIN

(75) Inventors: Tomoya Imanishi, Obu (JP); Youichi Hasegawa, Kasugai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/274,735

(22) Filed: Nov. 20, 2008

(65) Prior Publication Data

US 2009/0127965 A1 May 21, 2009

(30) Foreign Application Priority Data

Nov. 20, 2007 (JP) .............................. 2007-300904

(51) Int. Cl.
*H02K 3/32* (2006.01)
(52) U.S. Cl. ...................................... 310/194; 310/214
(58) Field of Classification Search ................. 310/194, 310/214, 216.079–216.089, 208; 336/208; 29/605, 606
See application file for complete search history.

(56) References Cited

U.S. PATENT DOCUMENTS 3,339,097 A * 8/1967 Dunn ......................... 310/194
4,816,710 A * 3/1989 Silvaggio et al. ............ 310/194
6,555,942 B1 * 4/2003 Hsu ........................... 310/208

FOREIGN PATENT DOCUMENTS

| GB | 2109168 A | * | 5/1983 |
| JP | 05056592 A | * | 3/1993 |
| JP | 08265998 A | * | 10/1996 |
| JP | 10225040 A | * | 8/1998 |
| JP | 2004088944 A | * | 3/2004 |
| JP | B2-3737461 | | 11/2005 |
| JP | A-2006-271121 | | 10/2006 |

OTHER PUBLICATIONS

JP 08265998 A-Translated Abstract, Oitate et al., 1996.*
JP 10225040 A-Translated Abstract, Noda, 1998.*
JP 2004088944 A-Translated Abstract, Shimizu, 2004.*

* cited by examiner

*Primary Examiner*—Quyen Leung
*Assistant Examiner*—Eric Johnson
(74) *Attorney, Agent, or Firm*—Oliff & Berridge, PLC

(57) ABSTRACT

The rotational electric machine includes a cylindrical yoke and a field winding connected to an inner surface of the cylindrical yoke. The field winding is composed of plural formed coils, each coupled to a bobbin. The bobbin includes a first flange for insulating the formed coil from the inner surface of the cylindrical yoke, a second flange for insulating the formed coil from a supporting brim of a pole core and a pipe portion for insulating the formed coil from a boss portion of the pole core. The first flange is made all around the pipe portion while the second flange is formed to extend only in the lateral direction of the pipe portion. The bobbin is easily coupled to the formed coil by flexibly bending the bobbin. Alternatively, the bobbin or bobbins may be made by folding a bobbin sheet after placing the formed coils on the bobbin sheet.

15 Claims, 8 Drawing Sheets

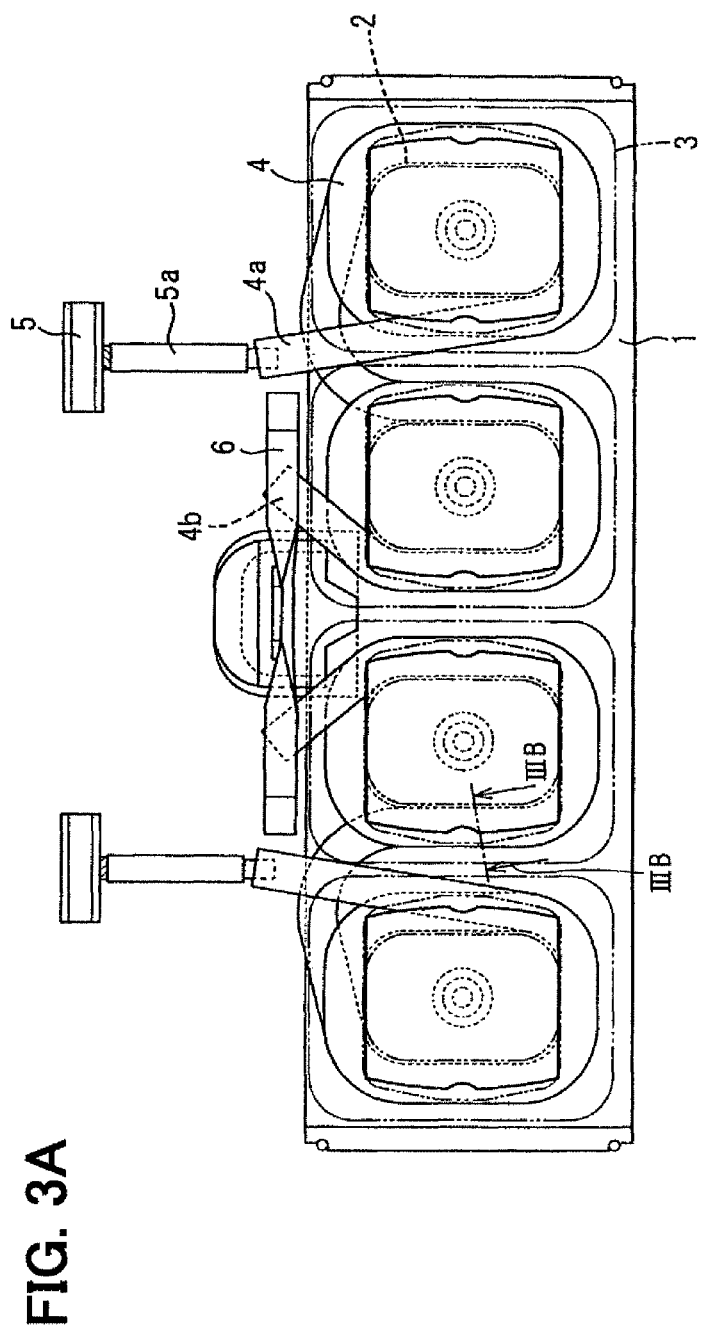
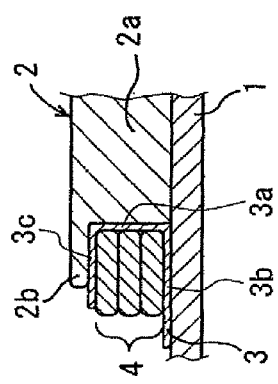
FIG. 3A
FIG. 3B

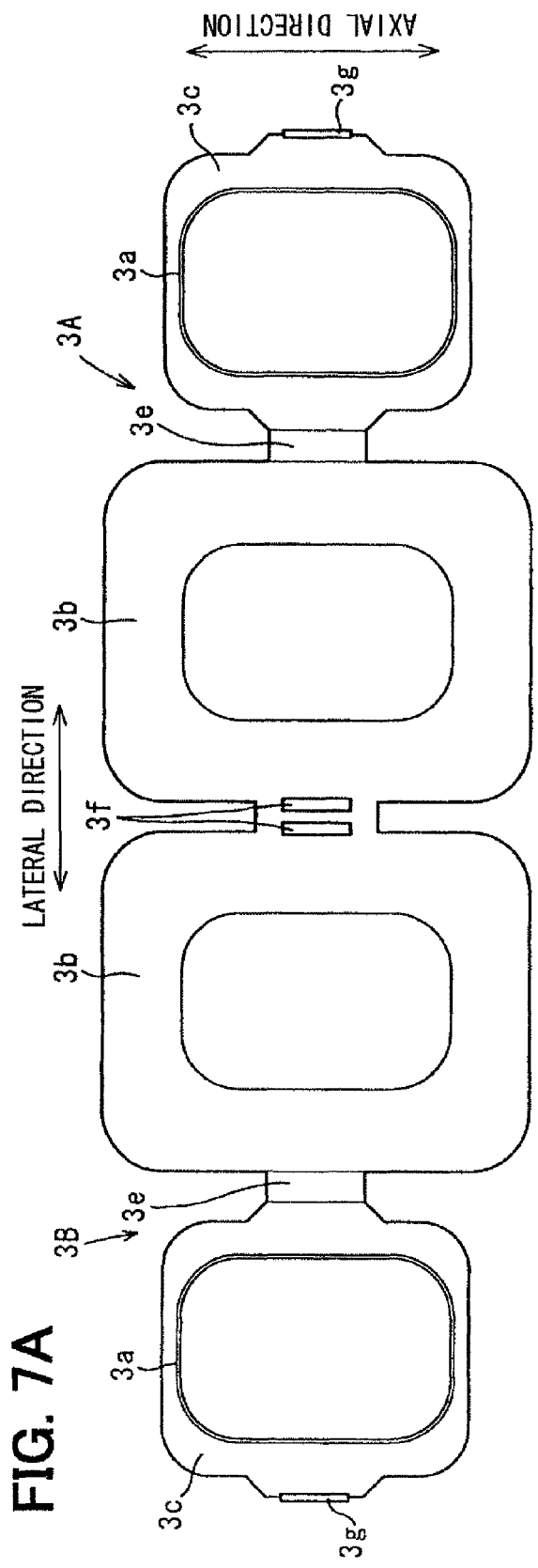
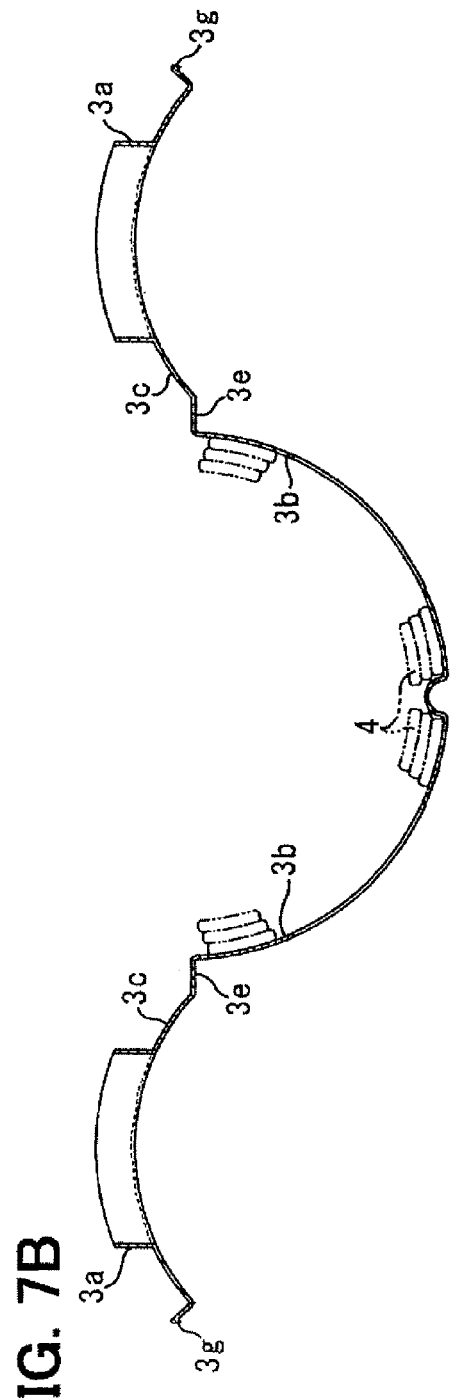
FIG. 7A
FIG. 7B

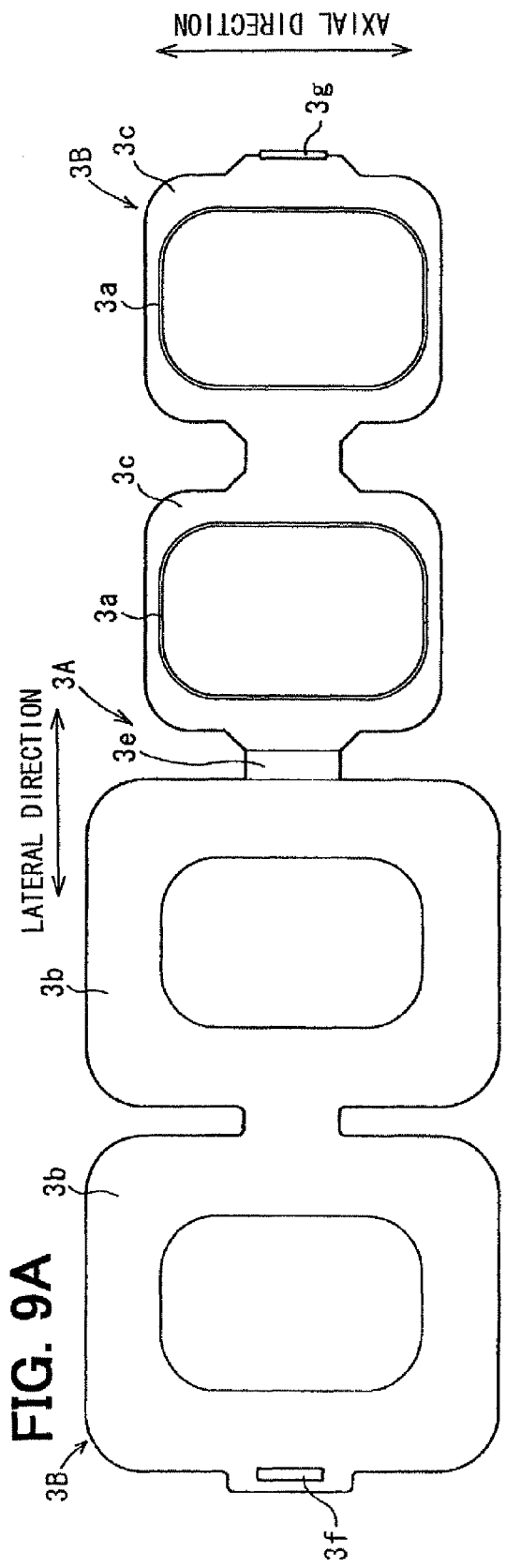
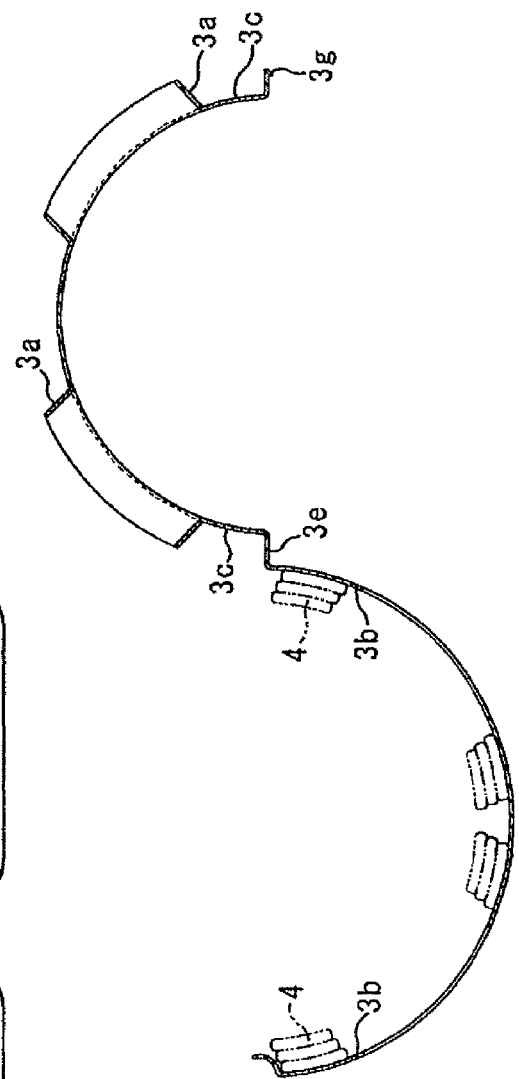
FIG. 9A
FIG. 9B

ROTATIONAL ELECTRIC MACHINE HAVING FIELD WINDING FORMED BY COUPLING FORMED COIL TO BOBBIN

CROSS-REFERENCE TO RELATED APPLICATION

This application is based upon and claims benefit of priority of Japanese Patent Application No. 2007-300904 filed on Nov. 20, 2007, the content of which is incorporated herein by reference.

BACKGROUND OF THE INVENTION

1. Field of the Invention

The present invention relates to a rotational electric machine having a field winding formed by coupling formed coils to respective bobbins. The field winding of this type is advantageously used in a starter motor for cranking an internal combustion engine.

2. Description of Related Art

An example of a direct current motor having a field winding is disclosed in JP-A-2006-271121. In this motor, the field winding is formed by winding a flat wire to improve a space factor of the field winding and to thereby make the motor compact. The flat wire is a wire having a substantially rectangular flat cross-section, and the flat wire is edgewise-wound (wound by bending the flat wire in its width direction) in this motor. JP-B2-3737461 discloses a flat wire coil edgewise-wound around a bobbin. By using the flat wire, the space factor of the winding is improved, compared with a round wire.

There is a problem, however, in winding the flat wire directly around a bobbin, especially when winding it edgewise. To wind the flat wire edgewise, a high bending force has to be applied to the flat wire against its high rigidity. Accordingly, a mechanical strength of a bobbin has to be made high by increasing its wall thickness. This makes the bobbin size large. Accordingly, a length of the coil becomes longer and its electrical resistance higher, adversely affecting an output of the motor. To overcome the above problem, it may be conceived to couple a wound coil to a bobbin. However, it is difficult to hold the wound coil between the flanges because the bobbin has flanges which are larger than an inner hole of the wound coil.

SUMMARY OF THE INVENTION

The present invention has been made in view of the above-mentioned problem, and an object of the present invention is to provide a rotational electric machine having an improved field winding in which a formed coil is easily coupled to a bobbin.

The rotational electric machine according to the present invention is advantageously used as a starter motor for cranking an internal combustion engine. The rotational electric machine includes a cylindrical yoke and a field winding disposed on an inner surface of the cylindrical yoke. The field winding is made by coupling formed coils to bobbins.

The bobbin includes a first flange for insulating the formed coil from an inner surface of the cylindrical yoke, a second flange for insulating the formed coil from a supporting brim of a pole core that connects the formed coil held in the bobbin to the cylindrical yoke and a pipe portion disposed between the first flange and the second flange for insulating the formed coil from a boss portion of the pole core. The formed coil which is made by winding a flat wire edgewise is held in the bobbin and connected to the inner surface of the cylindrical yoke by fastening the pole core to the cylindrical yoke.

The first flange is formed all around the pipe portion of the bobbin while the second flange is formed to extend from the pipe portion only in a lateral direction which is perpendicular to an axial direction of the cylindrical yoke. In other words, the second flange is made not to extend in the axial direction. A V-shaped cutout that is open to the second flange is made in each axial end wall of the pipe portion (which is located at the end of the pipe portion in the axial direction of the cylindrical yoke).

The bobbin is bent at the V-shaped cutouts and inserted into the inner hole of the formed coil. Because the second flange is made to extend only in the lateral direction, the second flange can be easily inserted into the formed coil by bending the bobbin at the V-shaped cutouts. After the formed coil is coupled with the pipe portion of the bobbin, the bobbin is returned to is original shape, thereby the formed coil is held between the first flange and the second flange. The second flange may be made to extend most at the center of the pipe portion and to gradually decrease its extended length toward the axial ends of the pipe portion. In this manner, the second flange can be further easily inserted into the formed coil. The first flange may be made to extend only in the lateral direction while making the second flange all around the pipe portion.

The bobbin may be made by folding a bobbin sheet having the first flange and the second flange, both flanges being connected to each other with a connecting portion. In this case, the pipe portion may be integrally formed with either one of the first flange or the second flange while separated from the other flange. After the formed coil is placed on the bobbin sheet, the bobbin sheet is folded to thereby firmly hold the formed coil in the bobbin. In this case, it is not necessary to make one of the flanges to extend only in the lateral direction because one of the flanges is not inserted into the formed coil.

Alternatively, two bobbins may be made by folding a combined bobbin sheet having a pair of first flanges and a pair of second flanges connected in series. The pipe portion may be integrally formed with either the first flange or the second flange. In this case, two bobbins holding the respective formed coils therein can be made at the same time.

According to the present invention, the bobbin is easily coupled to the formed coil. It is not necessary to give a mechanical strength to the bobbin because the bobbin is coupled to the coil after the coil is wound. Other objects and features of the present invention will become more readily apparent from a better understanding of the preferred embodiments described below with reference to the following drawings.

BRIEF DESCRIPTION OF THE DRAWINGS

FIG. 3A is a plan view showing a field winding having four coils, the field winding being shown in a spread manner;

FIG. 3B is a partial cross-sectional view, along line IIIB-IIIB shown in FIG. 3A, showing the bobbin held by a pole core connected to the cylindrical yoke;

FIG. 7A is a plan view showing a combined bobbin including first and second bobbins in a spread form as a third embodiment of the present invention;

FIG. 7B is a front view showing the combined bobbin shown in FIG. 7A;

FIG. 9A is a plan view showing a combined bobbin including first and second bobbins in a spread form, as a fourth embodiment of the present invention;

FIG. 9B is a front view showing the combined bobbin shown in FIG. 9A;

DETAILED DESCRIPTION OF THE PREFERRED EMBODIMENTS

A first embodiment of the present invention will be described with reference to FIGS. 1A-4. A rotational electric machine of this embodiment is used as a starter motor for cranking an internal combustion engine. The starter motor is a direct current motor and includes a cylindrical yoke having a field winding connected thereto and an armature rotatable in the cylindrical yoke.

Figure 4:
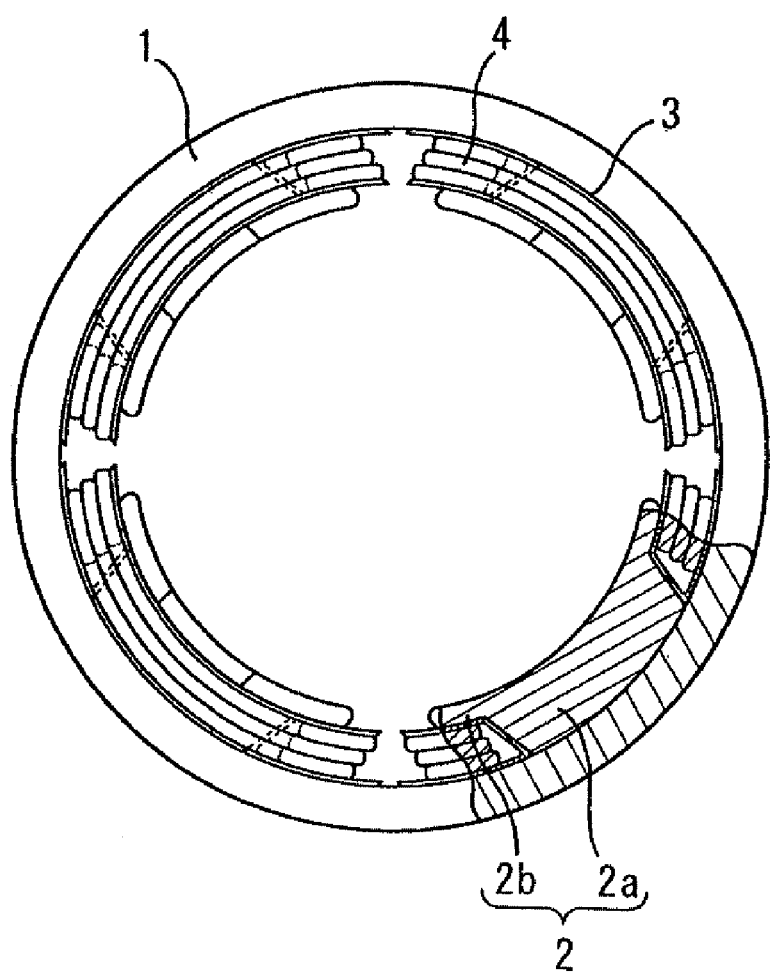
FIG. 4 is a front view showing a field winding connected to the cylindrical yoke, viewed in the axial direction of the cylindrical yoke.

As shown in FIG. 4, the cylindrical yoke 1 has a field winding composed of four formed coils 4 held in respective bobbins 3. The bobbin 3 is made of a resin material such as nylon. Each formed coil 4 held in the bobbin 3 is connected to an inner surface of the cylindrical yoke 1 with a pole core 2 composed of a boss portion 2a and a supporting brim 2b. The formed coil 4 held in the bobbin 3 is supported by the supporting brim 2b, and thereby the formed coil 4 is disposed on the inner surface of the cylindrical yoke 1.

Figure 11:
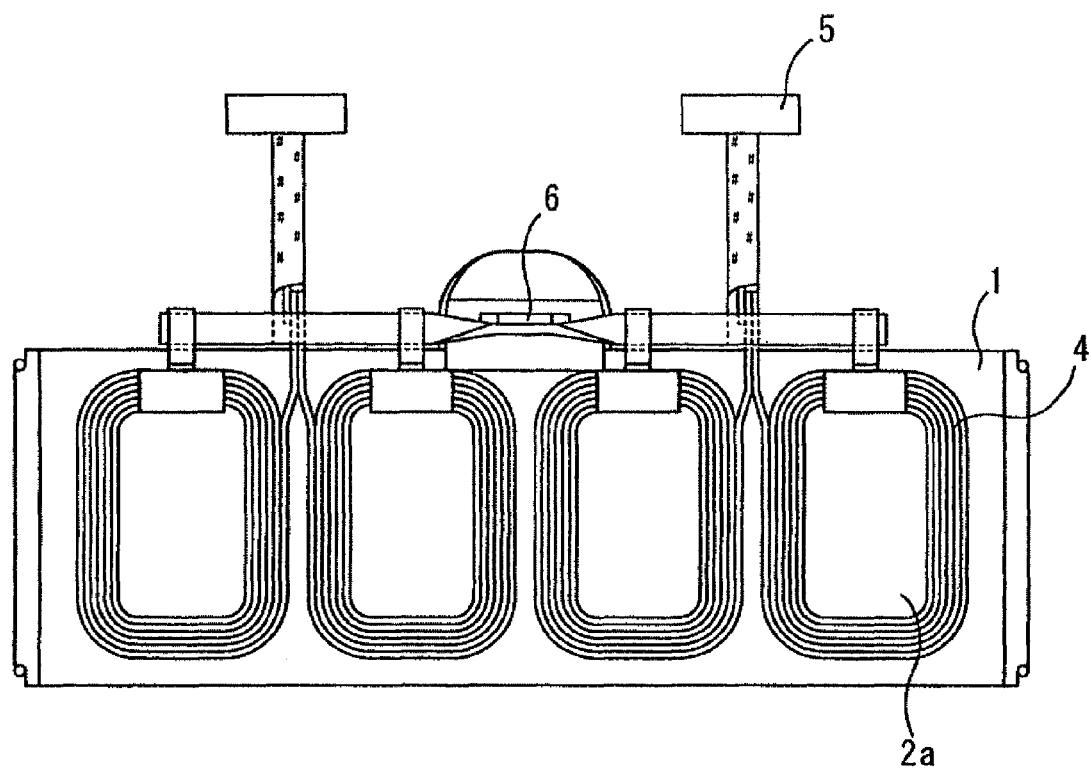
FIG. 11 is plan view showing a field winding wound flatwise in a spread form.

The cylindrical yoke 1 is formed by rounding a plate made of a magnetic material such as iron into a cylindrical shape. The pole core 2 is also made of a magnetic material. Four pole cores 2 are connected to the inner surface of the cylindrical yoke 1 at equal intervals. As shown in FIG. 3A, the field winding is composed of four formed coils 4 held in the respective bobbins 3. The formed coil 4 is made by winding a flat wire (having a substantially rectangular cross-section) on a jig in an edgewise manner. The edgewise winding means to wind the flat wire in its width direction forming the formed coil as shown in FIG. 4. As opposed to the edgewise winding, there is another way of winding the flat wire, i.e., a flatwise winding that forms a coil as shown in FIG. 11.

Two formed coils 4 are connected in series, making a pair of formed coils 4, and two pairs of the formed coils are connected in parallel. As shown in FIG. 3A, a coil end 4a led out of a pair of formed coils 4 is connected to a lead wire 5a of a plus-side brush 5, and another coil end 4b led out of the pair of formed coils 4 is connected to a motor lead plate 6.

The bobbin 3 is composed of a first flange 3b, a second flange 3c and a pipe portion 3a connecting both flanges 3b, 3c. As shown in FIG. 3B, the formed coil 4 is held in the bobbin 3 and connected to the inner surface of the cylindrical yoke 1 together with the bobbin 3. The pipe portion 3a insulates the formed coil 4 from the pole core 2, the first flange 3b insulates the formed coil 4 from the inner surface of the cylindrical yoke 1, and the second flange 3c insulates the formed coil 4 from the supporting brim 2b of the pole core 2.

Figure 1A:
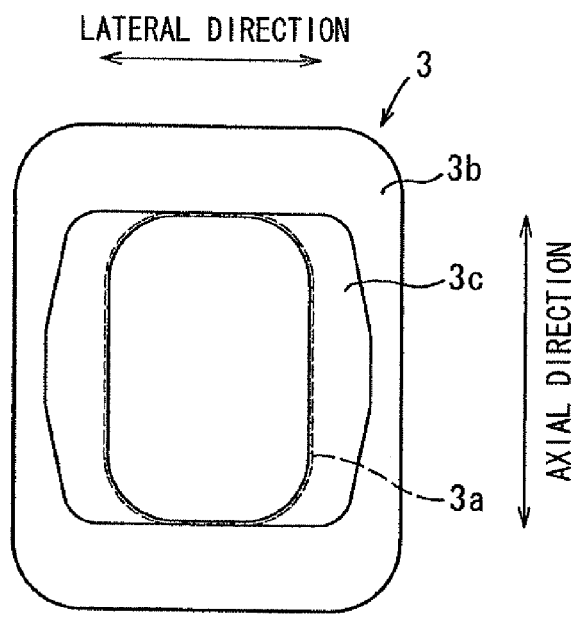
FIG. 1A is a plan view showing a bobbin to which a formed coil is coupled, as a first embodiment of the present invention.
Figure 1B:
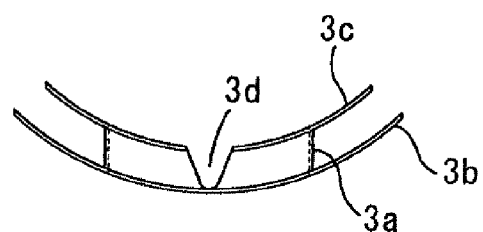
FIG. 1B is a front view of the bobbin, viewed in an axial direction of a cylindrical yoke.

Referring FIGS. 1A and 1B, some more details of the bobbin 3 will be described. The first flange 3b is formed all around the pipe portion 3a, while the second flange 3c is formed to extend only in a lateral direction (a direction perpendicular to the axial direction of the cylindrical yoke 1) of the pipe portion 3a. In other words, the second flange 3c is not formed in the axial direction of the pipe portion 3a. The second flange 3c is made to extend most in the lateral direction at a position corresponding to a center of the pipe portion 3a as shown in FIG. 1A. In other words, the extended width of the second flange 3b gradually increases toward the center of the pipe portion 3a and decreases toward both ends thereof. As shown in FIG. 1B, a V-shaped cutout 3d is formed in each axial end wall of the pipe portion 3a. The V-shaped cutout 3d is open at the second flange 3c.

Figure 2A:
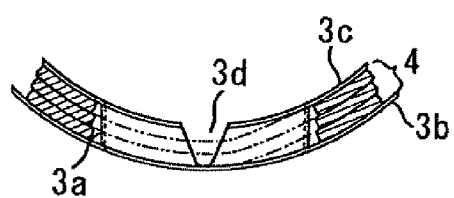
FIGS. 2A and 2B are drawings for explaining a process of coupling the bobbin with a formed coil.
Figure 2B:
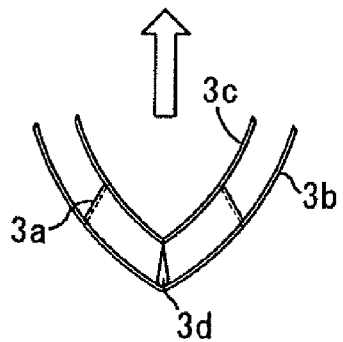

A process of coupling the bobbin 3 to the formed coil 4 will be explained with reference to FIGS. 2A and 2B. As shown in FIG. 2B, the bobbin 3 is bent at the cutouts 3d to thereby decrease a width of the second flange 3c. In this manner, the second flange 3c can be inserted into an inner hole of the formed coil 4. After the second flange 3c and the pipe portion 3a are inserted into the inner hole of the formed coil 4, the bobbin 3 is returned to its original shape as shown in FIG. 2A. Thus, the bobbin 3 is smoothly coupled to the formed coil 4.

Since the second flange 3c is formed only in the lateral direction (refer to FIG. 1A), the second flange 3c can be easily inserted into the inner hole of the formed coil 4 by bending the bobbin as shown in FIG. 2B. Since the width of the second flange 3c in the lateral direction (refer to FIG. 1A) is not uniform but widest at the center of the pipe portion 3a, it is not necessary to insert a whole portion of the second flange 3c at a same time. Instead, it can be inserted into the inner hole of the formed coil 4 from the widest center, and then other portions can be inserted. In this manner, the second flange 3c can be easily coupled to the formed coil 4.

Figure 5A:
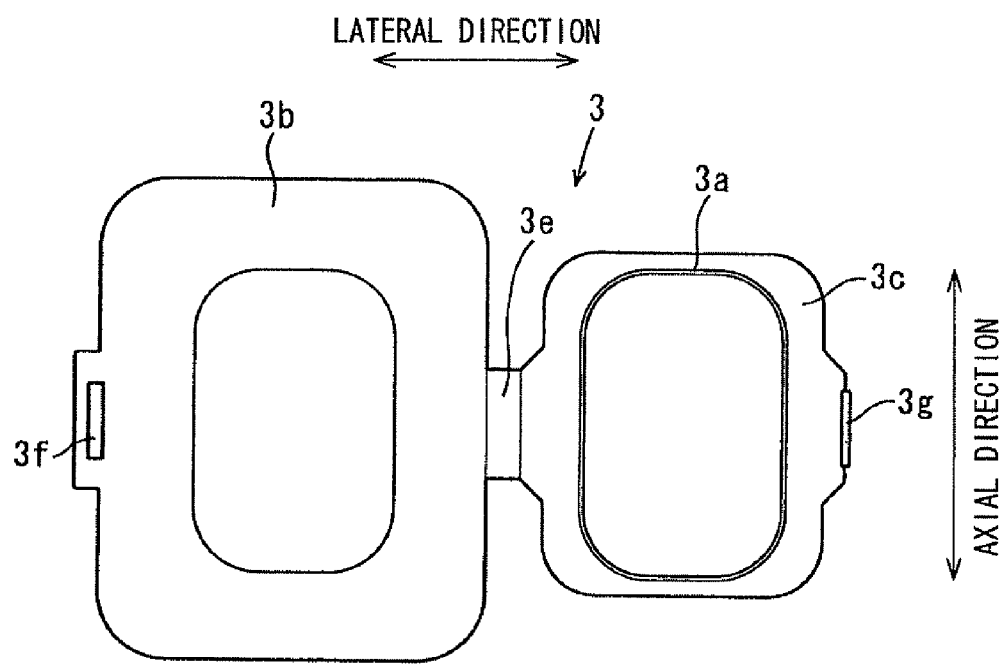
FIG. 5A is a plan view showing a bobbin that is spread, as a second embodiment of the present invention.
Figure 5B:
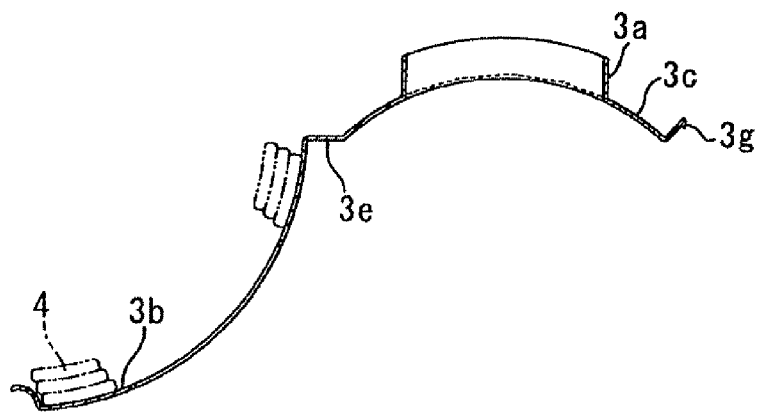
FIG. 5B is a front view showing the spread bobbin shown in FIG. 5A.
Figure 6:
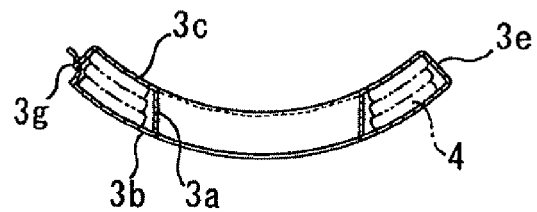
FIG. 6 is a front view showing a formed coil held in the bobbin shown in FIG. 5A.

A second embodiment of the present invention is shown in FIGS. 5A-6. In this embodiment, the first flange 3b and the second flange 3c are connected in the lateral direction by a connecting portion 3e, as shown in a spread manner (unfolded manner) in FIG. 5A. The pipe portion 3a is formed integrally with the second flange 3c. A claw 3g is formed at an lateral end of the second flange so that it is coupled to a connecting hole 3f formed at an end of the first flange 3b when the spread bobbin sheet 3 is folded.

With reference to FIGS. 5B and 6, a process of coupling the bobbin 3 to the formed coil 4 will be explained. The formed coil 4 is placed on the second flange 3b as shown in FIG. 5B. Alternatively, the formed coil 4 may be first coupled to the pipe portion 3a. Then the bobbin sheet is folded at the connecting portion 3e so that the pipe portion 3a is inserted into the inner hole of the formed coil 4. By folding the bobbin sheet, the formed coil 4 is held in the bobbin 3 as shown in FIG. 6. Then, the claw 3g is coupled to the connecting hole 3f. Thus, the bobbin 3 and the formed coil 4 are easily coupled at a right position with each other. The formed coil 4 coupled with the bobbin 3 is connected to the cylindrical yoke 1 with the pole core 2.

Since it is not necessary to insert the second flange 3c into the inner hole of the formed coil in this embodiment, the second flange can be made sufficiently wide to thereby improve insulation between the formed coil 4 and the supporting brim 2b of the pole core 2. Though the pipe portion 3a is formed integrally with the second flange 3c in this particular embodiment, it is possible to form the pipe portion 3a integrally with the first flange 3b.

Figure 8:
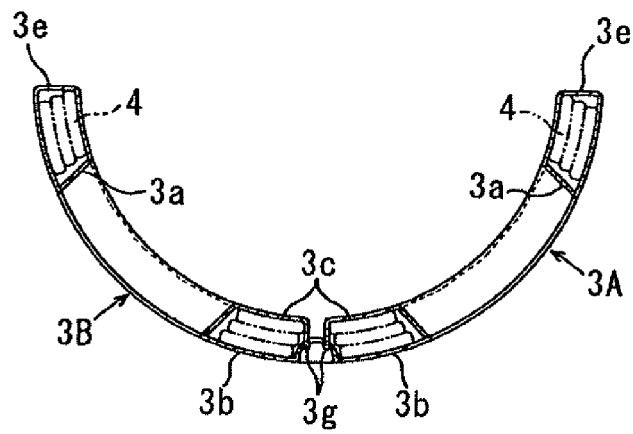
FIG. 8 is a front view showing formed coils held in the combined bobbin shown in FIG. 7A.

A third embodiment of the present invention is shown in FIGS. 7A-8. In this embodiment, a first bobbin 3A and a second bobbin 3B connected to each other are formed from a single sheet. As shown in FIG. 7A, each of the first bobbin 3A and the second bobbin 3B includes a first flange 3b, a second flange 3c and a pipe portion 3a connected to the second flange 3c. The first flange 3b and the second flange 3c are connected by a connecting portion 3e in the same manner as in the second embodiment. The first bobbin 3A and the second bobbin 3B are connected to each other by a bridging portion having connecting holes 3f.

As shown in FIGS. 7B and 8, two formed coils 4 are held in the combined bobbin having the first bobbin 3A and the second bobbin 3B. Each formed coil 4 is placed on the first flange 3b as shown in FIG. 7B, and then each pipe portion 3a is inserted into the inner hole of the formed coil 4 by folding the sheet at the connecting portion 3e. Then, the claw 3g is coupled to the connecting hole 3f. Thus, both of the bobbins 3A and 3B are coupled to the respective formed coils 4 at the same time, as shown in FIG. 8.

In addition to the advantages obtained in the second embodiment, a manufacturing process of coupling the formed coils with respective bobbins is simplified in the third embodiment because two bobbins are formed with a shingle sheet at the same time. Though the pipe portion 3a is integrally formed with the second flange 3c in this particular embodiment, it is possible to integrally form the pipe portion 3a with the first flange 3b.

Figure 10:
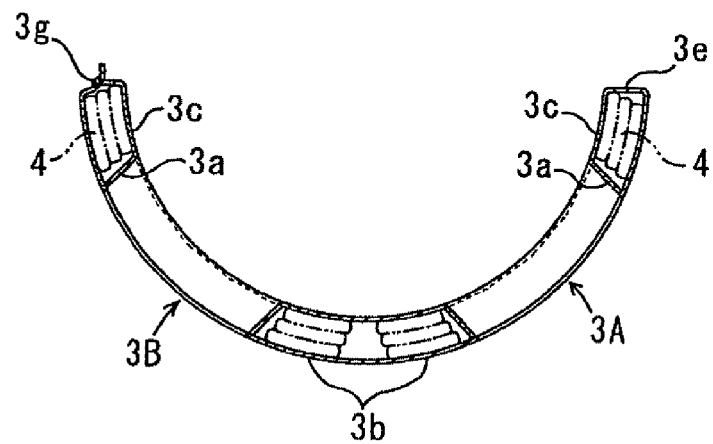
FIG. 10 is a front view showing formed coils contained in the combined bobbin shown in FIG. 9A.

A fourth embodiment of the present invention is shown in FIGS. 9A-10. This embodiment is similar to the third embodiment. In this fourth embodiment, however, a way of connecting the first bobbin 3A and the second bobbin 3B in a single bobbin sheet is different. That is, as shown in FIG. 9A, two first flanges 3b are connected side by side, while two second flanges 3c are connected side by side. The pair of first flanges 3b and the pair of second flanges 3c are connected with a connecting portion 3e. Each pipe portion 3a is integrally formed with the second flange 3c. Alternatively, the pipe portion 3a may be integrally formed with the first flange 3b. A claw 3g is formed at one end of the bobbin sheet, and a connecting hole 3f to be coupled to the claw 3g is formed at the other end.

The bobbin sheet is folded in a similar manner as in the third embodiment. As shown in FIGS. 9B and 10, each formed coil 4 is placed on the first flange 3b (or the inner hole of the formed coil 4 is coupled to the pipe portion 3a). Then, the pipe portion 3a inserted into the inner hole of the formed coil 4 by bending the bobbin sheet at the connecting portion 3e. Finally, the claw 3g is connected to the connecting hole 3f. Thus, the first bobbin 3A and the second bobbin 3B are coupled to the respective formed coils 4 as shown in FIG. 10. The same advantages as in the third embodiment are attained in this embodiment.

The present invention is not limited to the embodiments described above, but it may be variously modified. For example, though the formed coil 4 is wound edgewise in the foregoing embodiments, it may be wound flatwise as shown in FIG. 11. While the present invention has been shown and described with reference to the foregoing preferred embodiments, it will be apparent to those skilled in the art that changes in form and detail may be made therein without departing from the scope of the invention as defined in the appended claims.

What is claimed is:

1. A rotational electric machine comprising:
a cylindrical yoke; and
a field winding connected to an inner surface of the cylindrical yoke with a pole core having a boss portion and a supporting brim, the field winding being formed by coupling a formed coil to a bobbin, wherein:
the bobbin comprises:
a first flange for insulating the formed coil from the inner surface of the cylindrical yoke;
a second flange for insulating the formed coil from the supporting brim of the pole core; and
a pipe portion connecting the first flange and the second flange,
either of the first flange or the second flange is formed all around the pipe portion, while the other of the first flange or the second flange is formed to extend only in a lateral direction of the pipe portion, the lateral direction being perpendicular to an axial direction of the cylindrical yoke, and a V-shaped cutout is formed at each axial end wall of the pipe portion, the V-shaped cutout being open at the other of the first or the second flange,
wherein the V-shaped cutout is enlarged from the first flange to the second flange, and the first flange is configured to be connected to the inner surface of the cylindrical yoke.

2. The rotational electric machine as in claim 1, wherein a width of the other of the first flange or the second flange extending in the lateral direction of the pipe portion is the widest at an axial center of the pipe portion and becomes gradually narrower toward axial ends of the pipe portion.

3. The rotational electric machine as in claim 1, wherein the one of the first flange or the second flange that is formed all around the pipe portion of the bobbin is the first flange, and the other of the first flange or the second flange extending only in the lateral direction is the second flange.

4. A rotational electric machine comprising:
a cylindrical yoke; and
a field winding connected to an inner surface of the cylindrical yoke with a pole core having a boss portion and a supporting brim, the field winding being formed by coupling a formed coil to a bobbin, wherein:
the bobbin comprises:
a first flange for insulating the formed coil from the inner surface of the cylindrical yoke;
a second flange for insulating the formed coil from the supporting brim of the pole core; and
a pipe portion positioned between the first flange and the second flange,
the pipe portion is integrally formed with either one of the first flange or the second flange while separated from the other of the first flange or the second flange,
the first flange is connected to the second flange with a connecting portion, so that the bobbin is able to be unfolded in a form of a bobbin sheet, and
both the first flange and the second flange have curved shapes, and the curvatures of the curved shapes correspond to one another.

5. The rotational electric machine as in claim 4, wherein the bobbin sheet includes a claw formed at one lateral end of the bobbin and a connecting hole formed at the other lateral end of the bobbin, so that the claw is connected to the connecting hole when the bobbin sheet is folded.

6. The rotational electric machine as in claim 4, wherein a pair of bobbin sheets are connected into a combined single bobbin sheet that forms neighboring two bobbins in the cylindrical yoke when the combined single bobbin sheet is folded and mounted on the cylindrical yoke.

7. A rotational electric machine comprising:
a cylindrical yoke; and
a field winding connected to an inner surface of the cylindrical yoke with a pole core having a boss portion and a supporting brim, the field winding being formed by coupling formed coils to bobbins, wherein:
the bobbins include a first bobbin and a second bobbin disposed on the inner surface of the cylindrical yoke at neighboring positions,
each of the first and the second bobbin comprises:
a first flange for insulating the formed coil from the inner surface of the cylindrical yoke;
a second flange for insulating the formed coil from the supporting brim of the pole core; and
a pipe portion for insulating the formed coil from boss portion of the pole core,
the first bobbin and the second bobbin are formed by folding a single bobbin sheet having a pair of the first flanges connected to each other and a pair of the second flanges connected to each other, the pair of first flanges and the pair of second flanges being connected to each other via a connecting portion, the pipe portion being integrally formed with either the first flange or the second flange, and
both the first flange and the second flange have curved shapes, and the curvatures of the curved shapes correspond to one another.

8. The rotational electric machine as in claim 1, wherein both the first flange and the second flange have curved shapes, and curvatures of the curve shapes correspond to one another.

9. The rotational electric machine as in claim 1, wherein the V-shaped cutout is positioned on an inner surface of the axial end wall at a location where the bobbin is folded.

10. The rotational electric machine as in claim 4, wherein the connecting portion directly connects an end of the first flange and an end of the second flange in the form of the bobbin sheet.

11. The rotational electric machine as in claim 7, wherein the connecting portion directly connects an end of the first flange and an end of the second flange in the form of the bobbin sheet.

12. The rotational electric machine as in claim 4, wherein the bobbin is folded at the connecting portion.

13. The rotational electric machine as in claim 7, wherein the bobbin is folded at the connecting portion.

14. The rotational electric machine as in claim 1, wherein the V-shaped cutout has a rounded portion.

15. The rotational electric machine as in claim 1, wherein the V-shaped cutout has a base portion that is of a shape that results in a gap between a first side of the V-shaped cutout and a second side of the V-shaped cutout when the V-shaped cutout is folded toward a center axis of the V-shaped cutout.

* * * * *